US012319025B2

(12) United States Patent
Lomascolo et al.

(10) Patent No.: US 12,319,025 B2

(45) Date of Patent: Jun. 3, 2025

(54) PASSIVE TRACKING FOR INFLATABLE WEBS ALONG INFLATION NOZZLE

(71) Applicant: Sealed Air Corporation (US), Charlotte, NC (US)

(72) Inventors: Christian Theodore Lomascolo, Mooresville, NC (US); Ricky D. McDaniel, Harrisburg, NC (US)

(73) Assignee: Sealed Air Corporation (US), Charlotte, NC (US)

( * ) Notice: Subject to any disclaimer, the term of this patent is extended or adjusted under 35 U.S.C. 154(b) by 300 days.

(21) Appl. No.: 17/770,663

(22) PCT Filed: Oct. 21, 2020

(86) PCT No.: PCT/US2020/056562

§ 371 (c)(1),
(2) Date: Apr. 21, 2022

(87) PCT Pub. No.: WO2021/081025

PCT Pub. Date: Apr. 29, 2021

(65) Prior Publication Data

US 2022/0363028 A1 Nov. 17, 2022

Related U.S. Application Data

(60) Provisional application No. 62/924,316, filed on Oct. 22, 2019.

(51) Int. Cl.
*B31D 5/00* (2017.01)

(52) U.S. Cl.
CPC .... *B31D 5/0073* (2013.01); *B31D 2205/0017* (2013.01); *B31D 2205/0047* (2013.01)

(58) Field of Classification Search
CPC .......... B31D 5/0073; B31D 2205/0017; B31D 2205/0047
See application file for complete search history.

(56) References Cited

U.S. PATENT DOCUMENTS

| | | | |
|---|---|---|---|
| 3,142,599 | A | 7/1964 | Chavannes |
| 3,208,898 | A | 9/1965 | Chavannes et al. |
| 3,285,793 | A | 11/1966 | Chavannes |
| 3,508,992 | A | 4/1970 | Chavannes |
| 3,586,565 | A | 6/1971 | Fielding |
| 3,616,155 | A | 10/1971 | Chavannes |
| 3,660,189 | A | 5/1972 | Constantine |

(Continued)

*Primary Examiner* — Thomas M Wittenschlaeger

(74) *Attorney, Agent, or Firm* — Jon Isaacson

(57) ABSTRACT

A system includes a supply of an inflatable web (100) and a nozzle (240). The inflatable web includes chambers (116), an inflation channel (112), and cross seals (114) between the inflation channel and the chambers. The inflatable web also includes ports (124) that pass through the cross seals to permit gas to pass from the inflation channel to the chambers. The nozzle has an outlet (242) configured to insert gas into the inflation channel as the inflatable web is moved in a downstream direction. The system is configured to feed the inflatable web along a path from the supply and past the nozzle in the downstream direction. The system is configured to hold the supply of the inflatable web with respect to the nozzle such that the cross seals contact the nozzle and rides along a portion of the nozzle as the inflatable web is moved in the downstream direction.

17 Claims, 10 Drawing Sheets

(56) References Cited

U.S. PATENT DOCUMENTS

| | | | | |
|---|---|---|---|---|
| 4,181,548 | A | 1/1980 | Weingarten | |
| 4,184,904 | A | 1/1980 | Gaffney | |
| 4,415,398 | A | 11/1983 | Ottaviano | |
| 4,576,669 | A | 3/1986 | Caputo | |
| 4,579,516 | A | 4/1986 | Caputo | |
| 6,635,145 | B2 * | 10/2003 | Cooper | B65D 81/052 53/472 |
| 6,800,162 | B2 | 10/2004 | Kannankeril et al. | |
| 6,982,113 | B2 | 1/2006 | Kannankeril et al. | |
| 7,018,495 | B2 | 3/2006 | Kannankeril et al. | |
| 7,150,136 | B2 | 12/2006 | Perkins et al. | |
| 7,165,375 | B2 | 1/2007 | O'Dowd | |
| 7,220,476 | B2 | 5/2007 | Sperry et al. | |
| 7,223,461 | B2 | 5/2007 | Kannankeril et al. | |
| 7,429,304 | B2 | 9/2008 | McNamara et al. | |
| 7,721,781 | B2 | 5/2010 | Sperry et al. | |
| 7,950,433 | B2 | 5/2011 | Sperry et al. | |
| 9,969,136 | B2 | 5/2018 | Lepine et al. | |
| 10,286,617 | B2 * | 5/2019 | Murch | B29D 22/02 |
| 2006/0174589 | A1 * | 8/2006 | O'Dowd | B31D 5/0073 53/79 |
| 2007/0011989 | A1 * | 1/2007 | Sperry | B29C 66/1122 53/403 |
| 2007/0251631 | A1 * | 11/2007 | Garceau | B29C 66/83433 156/147 |
| 2010/0024961 | A1 * | 2/2010 | Wetsch | B31D 5/0073 156/147 |
| 2019/0009476 | A1 * | 1/2019 | Sperry | B65H 20/02 |
| 2019/0308791 | A1 * | 10/2019 | Bates | B65D 81/052 |
| 2022/0363028 | A1 * | 11/2022 | Lomascolo | B31D 5/0073 |

* cited by examiner

PASSIVE TRACKING FOR INFLATABLE WEBS ALONG INFLATION NOZZLE

BACKGROUND

The present disclosure is in the technical field of inflation and sealing machines for inflatable webs. More particularly, the present disclosure is directed to passive tracking for inflatable webs along an inflation nozzle.

Inflated material or structures such as cushions or sheets can be used to package items, by wrapping the items in the material and placing the wrapped items in a shipping carton, or simply placing inflated material inside of a shipping carton along with an item to be shipped. The inflated material protects the packaged item by absorbing impacts that may otherwise be fully transmitted to the packaged item during transit, and may also restrict movement of the packaged item within the carton to further reduce the likelihood of damage to the item.

Systems and machines for manufacturing inflated material at relatively high speeds from an inflatable web would benefit from better alignment, tracking, and tension control of the inflatable web as it moves through the machine. This can help to reduce one or more of the noise associated with inflation of the web, improve efficient use of the inflation gas, increase inflation pressure efficiency, reduce wear on the machine parts, reduce down-time, and avoid poorly-inflated, non-inflated, and/or poorly-sealed inflated material, which may result in web wastage and/or premature deflation or other failure in protecting a packaged product. Accordingly, there remains a need in the art for improvements to systems for inflating inflatable webs in the protective packaging field.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, a system includes a supply of an inflatable web and a nozzle. The inflatable web includes chambers, an inflation channel, and cross seals between the inflation channel and the chambers. The inflatable web includes ports that pass through the cross seals to permit gas to pass from the inflation channel to the chambers. The nozzle has an outlet configured to insert gas into the inflation channel as the inflatable web is moved in a downstream direction. The system is configured to feed the inflatable web along a path from the supply and past the nozzle in the downstream direction. The system is configured to hold the supply of the inflatable web with respect to the nozzle such that the cross seals contact the nozzle and rides along a portion of the nozzle as the inflatable web is moved in the downstream direction.

In a second embodiment, the supply of the first embodiment is arranged with respect to the nozzle so that a top of the nozzle is located higher than a bottom of the cross seals of the inflatable web when the inflatable web on the supply.

In a third embodiment, the cross seals of the second embodiment are biased toward the nozzle by gravity so that the cross seals contact the nozzle as the inflatable web is fed through the system.

In a fourth embodiment, the system of any of the second and third embodiments further comprises a seal system configured to form a seal in the inflatable web across the ports as the inflatable web is fed through the system.

In a fifth embodiment, the seal system of the fourth embodiment is arranged with respect to the nozzle so that the seal system is configured to form the seal in the inflatable web across the ports at a location that is higher than the top of the nozzle.

In a sixth embodiment, the system of any of the fourth or fifth embodiments further comprises an engagement system configured to hold closed two sides of the inflation channel between the outlet of the nozzle and the seal system.

In a seventh embodiment, the engagement system of the sixth embodiment is configured to bring the two sides of the inflation channel together in proximity to a bottom of the nozzle.

In an eighth embodiment, the nozzle of any of the second to eighth embodiments includes a portion that extends from a support structure and curved portion that curves in a downstream direction such that the outlet is oriented in the downstream direction.

In a ninth embodiment, the system of the eighth embodiment is configured to hold the supply of the inflatable web with respect to the nozzle such that initial contact of the cross seals with the nozzle occurs in the curved portion of the nozzle.

In a tenth embodiment, the nozzle of the ninth embodiment is configured such that the cross seals ride along the top of the nozzle after the initial contact of the cross seals with the curved portion of the nozzle.

In an eleventh embodiment, the nozzle of any of the second to tenth embodiments includes a block that extends from a support structure and tube that extends in the downstream direction from the block such that the outlet is oriented in the downstream direction.

In a twelfth embodiment, the block of the eleventh embodiment includes a ramped surface that extends upward in the downstream direction.

In a thirteenth embodiment, the system of the twelfth embodiment is configured to hold the supply of the inflatable web with respect to the nozzle such that initial contact of the cross seals with the nozzle occurs on the ramped surface of the block.

In a fourteenth embodiment, the nozzle of the thirteenth embodiment is configured such that the cross seals ride along the top of the tube after the initial contact of the cross seals with the ramped surface.

In a fifteenth embodiment, the system of any of the second to fourteenth embodiments further comprises a spindle configured to hold the supply of the inflatable web and the supply is in the form of a roll of the inflatable web.

In a sixteenth embodiment, the spindle of the fifteenth embodiment is arranged such that the spindle is at a non-straight angle with respect to vertical.

In a seventeenth embodiment, the system of the any of the fifteenth or sixteenth embodiments further comprises a support located underneath the supply, the support having a hub that includes a hole. The spindle passes through the hole in the hub of the support. The support is configured to rotate with respect to the spindle. The support includes a plurality of arms that extend away from the hub so that the plurality of arms extend beyond an outer circumference of the roll of the inflatable web.

In an eighteenth embodiment, a length of one of the cross seals between two consecutive ports of any of the preceding embodiments is less than a length of at least one of the two consecutive ports.

In a nineteenth embodiment, a length of one of the cross seals between two consecutive ports of any of the preceding embodiments is greater than a length of at least one of the two consecutive ports.

In a twentieth embodiment, the system of any of the preceding embodiments further comprises a routing member positioned such that the inflatable web passes around a portion of the routing member as the inflatable web is fed in the downstream direction. The routing member is further configured to induce tension in at least a portion of the inflatable web downstream of the routing member. The at least a portion of the inflatable web in which the routing member induces tension includes the inflation channel.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

In some examples herein, inflated panels formed from inflatable webs are cushion material is referred to as air cellular material. As used herein, the term "air cellular material" herein can refer to bubble cushioning material, such as BUBBLE WRAP® air cushioning material sold by Sealed Air Corporation, where a first film or laminate is formed (e.g., thermoformed, embossed, calendared, or otherwise processed) to define a plurality of cavities and a second film or laminate is adhered to the first film or laminate in order to close the cavities. As used herein, the term "air cellular material" herein can refer to inflatable cushioning material, such as BUBBLE WRAP® IB air cushioning material sold by Sealed Air Corporation or FILL-AIR® air pillows void fill material sold by Sealed Air Corporation, where an inflatable web can be inflated and sealed to form the air cellular material. Examples of air cellular materials are shown in U.S. Pat. Nos. 3,142,599, 3,208,898, 3,285,793, 3,508,992, 3,586,565, 3,616,155, 3,660,189, 4,181,548, 4,184,904, 4,415,398, 4,576,669, 4,579,516, 6,800,162, 6,982,113, 7,018,495, 7,165,375, 7,220,476, 7,223,461, 7,429,304, 7,721,781, 7,950,433, 9,969,136 and 10,286,617, the disclosures of which are hereby incorporated by reference in their entirety.

Figure 1B:
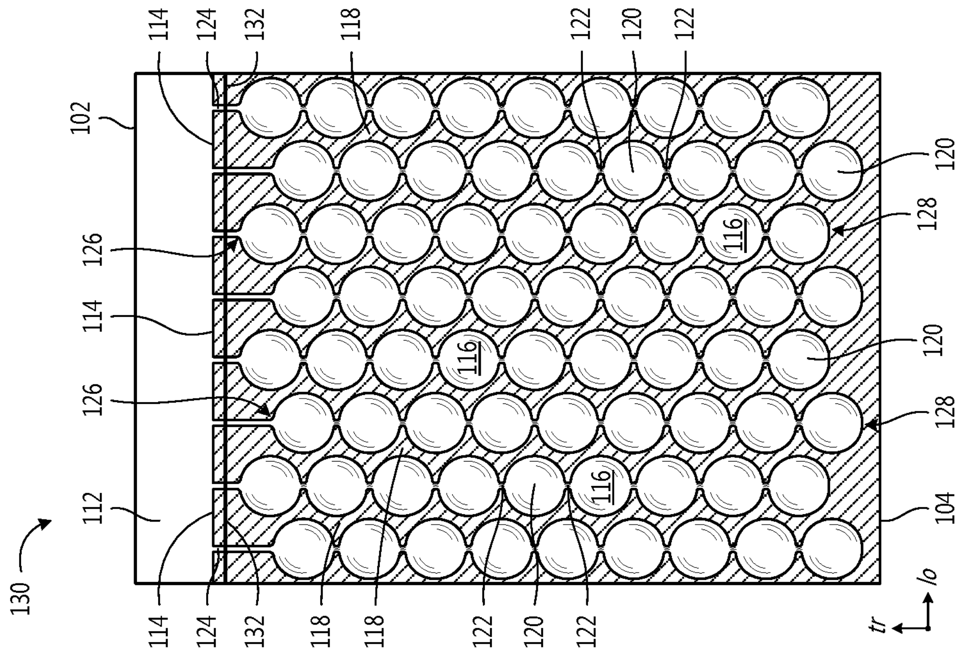
FIG. 1B depicts an embodiment of an inflated panel formed from the inflatable web shown in FIG. 1A, in accordance with the embodiments disclosed herein.
Figure 1A:
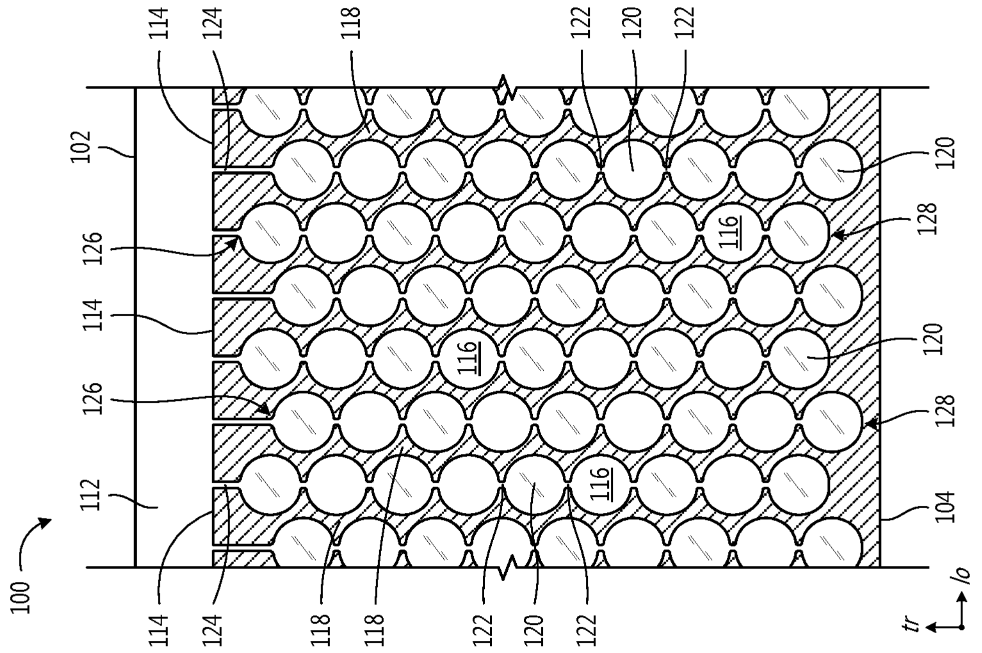
FIG. 1A depicts a front view of an embodiment of an inflatable web, in accordance with the embodiments disclosed herein.

FIG. 1A depicts a front view of an embodiment of an inflatable web 100. The inflatable web 100 includes two juxtaposed sheets that are arranged such that the inflatable web 100 includes a longitudinal edge 102 and a longitudinal edge 104. Inner surfaces of the two sheets are sealed to each other in a pattern that defines a series of chambers 116. In some embodiments, seals between the two sheets include seals 118 that define the chambers 116. In the depicted embodiment, the chambers 116 are shaped to have a series of cells 120 and passageways 122. In some embodiments, the cells 120 have a larger width than the passageways 122. In the depicted embodiment, the cells 120 have a generally circular shape such that, after the cells 120 are inflated, the cells 120 would have a three-dimensional "bubble" shape. In other embodiments, the cells 120 may have other shapes, such as rectangular shapes, hexagonal shapes, and the like. In the depicted embodiment, adjacent ones of the chambers 116 are offset from each other so that the cells 120 of one chamber are aligned with the passageways 122 of an adjacent chamber to enable the chambers 116 to be arranged in close proximity to each other.

In general, any of the sheets described herein may comprise any flexible material that can be manipulated to enclose a gas in inflatable chambers as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from C3 to C20 alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known coextrusion process by melting the component polymer(s) and extruding or coextruding them through one or more flat or annular dies.

In some embodiments, the seals 118 also define ports 124. Each of the ports 124 permits fluid, such as gas (e.g., air), to pass from an inflation channel 112 into one of the chambers 116. In the depicted embodiment, the seals 118 also form cross seals 114 between the inflation channel 112 and the chambers 116. The ports 124 pass through the cross seals 114 to permit gas to pass from the inflation channel 112 into the chambers 116. In some embodiments, the inflation channel 112 is "open" because the two sheets are not connected at the longitudinal edge 102. When the inflation channel 112 is open, the inflation channel 112 can be positioned such that, as the inflatable web 100 is fed, a nozzle passes through the inflation channel 112 between the two sheets. In some embodiments, the inflation channel 112 is "closed" because the two sheets are connected at the longitudinal edge 102. When the inflation channel 112 is closed, the inflation channel 112 can be positioned such that, as the inflatable web 100 is fed, a nozzle is inserted into the inflation channel 112 between the two sheets and then the inflation channel 112 is slit open to permit the two sheets to pass on other side of the nozzle. Whether the inflation channel 112 is open or closed, the nozzle can inflate the chambers 116 inserting air into the inflation channel 112 that passes through the ports 124 and into the chambers 116.

In some embodiments, the chambers 116 extend in a transverse direction between the two longitudinal edges 102 and 104. In the depictions shown herein, the transverse directions on inflatable webs and inflated webs are generally indicated by the arrow tr and the longitudinal directions on inflatable webs and inflated webs are generally indicated by the arrow lo. Generally, the longitudinal direction of an inflatable web is substantially parallel to the longitudinal edges 102 and 104 and the transverse direction of the inflatable web is substantially perpendicular to the longitudinal direction. In the depicted embodiment, the chambers 116 have proximal ends 126 and distal ends 128. The proximal ends 126 are the end of the chambers 116 that is closest to the longitudinal edge 102 and/or closest to the inflation channel 112. The distal ends 128 are the end of the chambers 116 that are closest to the longitudinal edge 104. In the depicted embodiment, the distal ends 128 of the chambers 116 are closed. In other embodiments, the distal ends 128 may be in fluid communication with another inflation chamber located along the longitudinal edge 104.

FIG. 1B depicts an embodiment of an inflated panel 130 formed from the inflatable web 100. The inflated panel 130 was formed by inflating some of the chambers 116 of the inflatable web 100, forming a seal 132 across the ports 124 of the chambers 116, and cutting the sheets in the transverse direction tr to cut the inflated panel 130 from the inflatable web 100. The inflated panel 130 can be used as cushioning material and/or void fill material. For example, the inflated panel 130 can be placed in a shipping container to cushion a product in the shipping container and/or fill a void between the object and the walls of the shipping container.

The location of the seal 132 can have an effect on the performance and appearance of the inflated panel 130. In the depicted embodiment, the seal 132 extends in the longitudinal direction lo through the cross seals 114 and across the ports 124. The seal 132 is not located in the inflation channel 112 or across any of the chamber 116. If the seal 132 was formed lower in the transverse direction tr, when viewing FIG. 1B, the seal 132 could be located across some of the cells 120. In this case, some of the cells 120 would not be fully inflated, resulting in a reduced width of cushioning provided by the inflated panel 130 and potentially rendering the inflated panel 130 aesthetically displeasing to a user. If the seal 132 was formed higher in the transverse direction tr, when viewing FIG. 1B, the seal 132 could be located in the inflation channel 112. In this case, the ports 124 would not be closed and the chambers 116 would remain fluidly coupled to each other via the inflation channel 112. In some embodiments, the sides of the inflated panel 130 may not be sealed to each other so that the sides of the inflation channel 112 are open. In these embodiments, the chambers 116 would quickly deflate if the seal 132 was in the inflation channel 112.

Some existing inflation and seal machines have addressed the issue of proper seal location using an active film control. For example, U.S. Pat. No. 10,286,617 describes a positioning mechanism that controls the position of a supply roll of infallible film on a spindle of the inflation and seal machine. The positioning mechanism controls the position of the roll on the spindle based on feedback from a web tracking sensor that detects a transverse position of the film. Other existing inflation and seal machines have addressed the issue of proper seal location using a guide that protrudes upstream into the inflation channel as the film passes. For example, U.S. Pat. No. 7,150,136 describes a system where a supply roll rests on rollers with the axis of the supply roll substantially horizontal. The film is fed such that a bulb end of an inflation tube is inserted into the inflation channel of the film upstream of the outlet of the nozzle.

While the film control solutions in existing inflation and seal machines are capable of properly positioning film, the existing film control solutions have drawbacks. In one example, an inflation and seal machine that has active film tracking includes components (e.g., sensors, actuators, etc.) that increase the cost of the machine. Also, the amount of time and effort to install and service the machine can increase with active tracking on the machine. In another example, a guide that protrudes upstream into an inflation channel can be problematic if the film is not feed properly ahead of the guide. If the film is not thread properly, the inflation channel can catch on the guide, leading to jams, physical deformation of the inflation channel, and/or rupture of the inflation channel.

Figure 2:
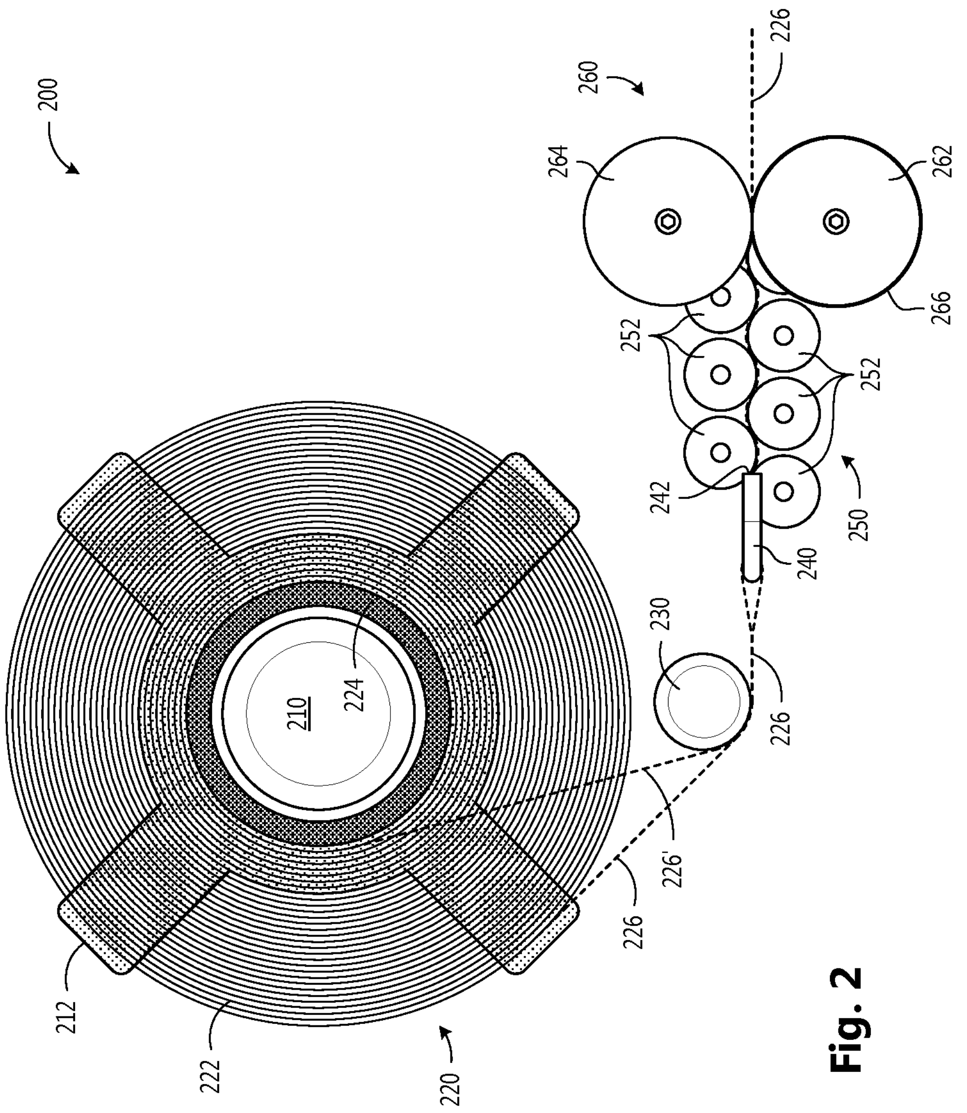
FIGS. 2 and 3A depict top and side views, respectively, of an embodiment of a system for inflating and sealing an inflatable web, in accordance with the embodiments disclosed herein.
Figure 3A:
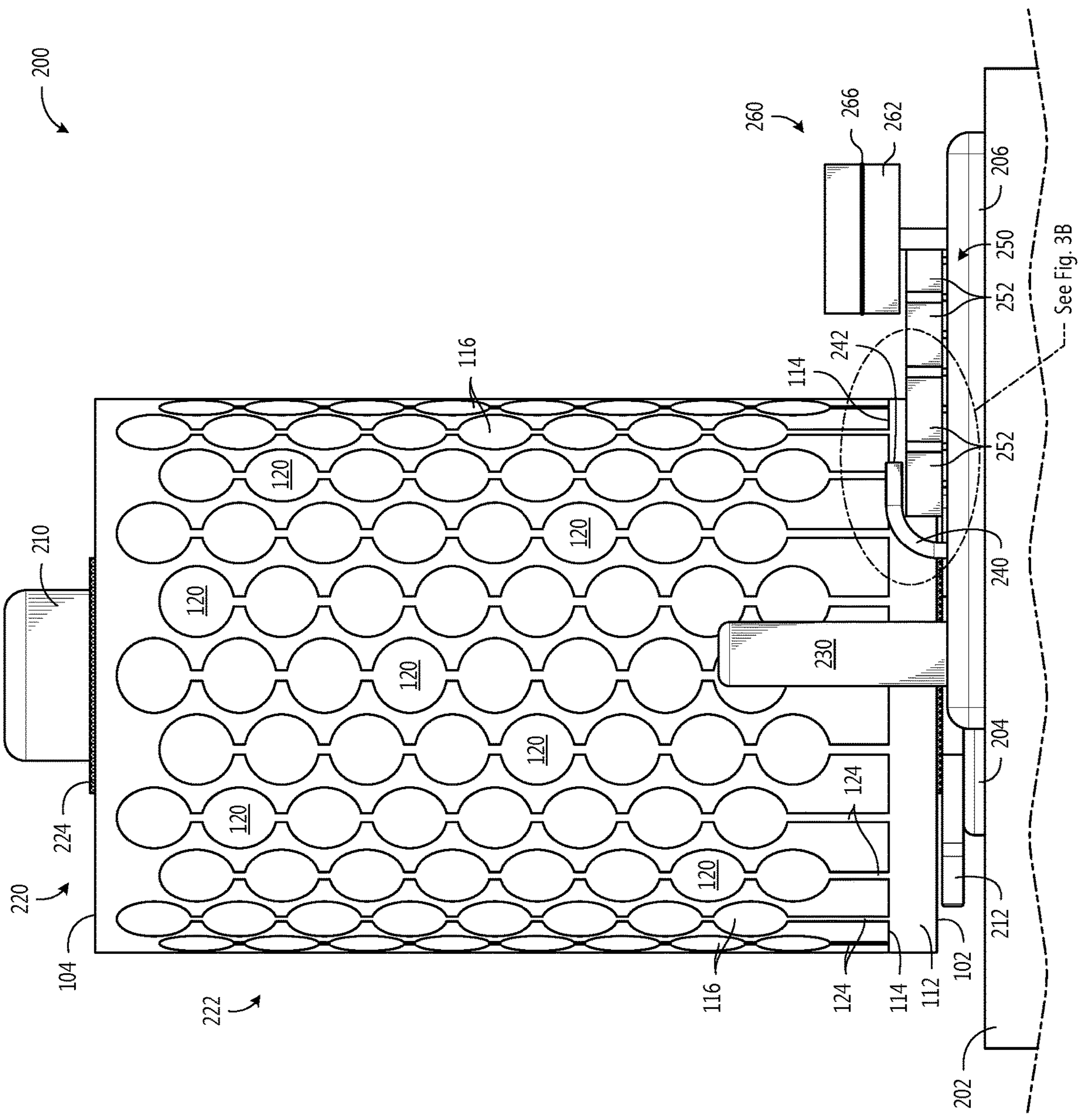

Depicted in FIGS. 2 and 3A are top and side views, respectively, of an embodiment of a system 200 for inflating and sealing an inflatable web. The system 200 includes a support structure 202. In some embodiments, components of the system 200 are configured to be coupled to the support structure 202. In some embodiments, the support structure 202 includes a housing configured to house some of the components of the system 200 and/or provide protection for users of the system 200 (e.g., a physical barrier from moving parts, electrical insulation from powered components, etc.). In the depicted embodiment, the support structure 202 includes raised surfaces 204 and 206 configured to hold particular components at a height with respect to each other, as is discussed in greater detail below.

The system 200 includes a spindle 210 configured to hold a supply 220 of an inflatable web 222. In the depicted embodiment, the spindle 210 is oriented such that the axis of the spindle 210 is substantially vertical. In other embodiments, the spindle 210 can be oriented such that the axis of the spindle 210 is at any non-vertical and non-horizontal angle (e.g., at 10° with respect to vertical, at 20° with respect to vertical, at 30° with respect to vertical, etc.). In the depicted embodiment, the supply 220 is a roll of the inflatable web 222 that is wound around a core 224. In other embodiments, the system 200 can include any other device for holding a supply of inflatable web, such as a dispenser configured to hold a supply of inflatable web in the form of a fanfolded stack of the inflatable web.

In the depicted embodiment, the spindle 210 extends from the raised surface 204 of the support structure 202. In some embodiments, the spindle 210 is fixedly coupled to the support structure 202 and the supply 220 of the inflatable web 222 is configured to rotate with respect to the spindle 210 while the inflatable web 222 is withdrawn from the supply 220. In other embodiments, the spindle 210 is rotatably coupled to the support structure 202 so that the spindle 210 rotates with the supply 220 of the inflatable web 222 while the inflatable web 222 is withdrawn from the supply 220. In the depicted embodiment, the spindle 210 includes a support 212 located underneath the supply 220. The support 212 is located on the raised surface 204 and the spindle 210 passes through a hole in the support 212. In the depicted embodiment, the support 212 is not coupled to the support structure 202 or to the spindle 210 such that the support 212 is capable of moving with respect to each of the support structure 202 and the spindle 210. When the supply 220 is placed on the support 212, the friction between the supply 220 and the support 212 may cause the support 212 to rotate with the supply 220 while the inflatable web 222 is withdrawn from the supply 220. In the depicted embodiment, the support 212 includes a plurality of arms that extend away from a hub so that the arms extend beyond the outer circumference of the roll of the inflatable web 222 at a number of locations around the roll. In other embodiments, the support 212 may be a disc extending beyond the outer circumference of the roll around the entirety of the roll.

As can be seen in FIG. 3A, the inflatable web 222 in the depicted embodiment is similar to the inflatable web 100 described above with respect to FIGS. 1A and 1B. The depiction of the inflatable web 222 includes reference numbers associated with inflatable web 100 and it will be understood that those features of inflatable web 222 are similar to or the same as the corresponding features described with respect to inflatable web 100. In other embodiments, the inflatable web 222 can be replaced with any number of other types of inflatable webs, such as inflatable air pillows, inflatable bubble pouches, or any of the other inflatable air cellular materials described in the references that are incorporated by reference. The inflatable web 222 is oriented so that the longitudinal edge 102 is located closer to the support structure 202 than the longitudinal edge 104. In this way, the inflation channel 112 is located closer to the support structure 202 than the chambers 116 are to the support structure 202.

The system 200 further includes a routing member 230. In the depicted embodiment, the routing member 230 extends from the raised surface 206 of the support structure. In some embodiments, the routing member 230 is fixedly coupled to the support structure 202 such that the routing member 230 does not move or rotate with resect to the support structure 202 while the inflatable web 222 is withdrawn from the supply 220. Depicted in FIG. 2 is a path 226 along which the inflatable web 222 is fed from the supply 220. As can be seen, the routing member 230 is arranged so that the inflatable web 222 passes around a portion of the routing member 230 along the path 226. This allows the inflatable web 222 to pass along the same path 226 downstream from the routing member 230 regardless of whether the supply 220 is full (as shown by the path 226 upstream of the routing member 230) or partially full (as shown by the path 226 upstream of the routing member 230). The routing member 230 is also configured to induce tension in the inflatable web 222, at least in the inflation channel 112, downstream of the routing member 230. In the depicted embodiment shown in FIG. 3A, the routing member 230 does not extend away from the support structure 202 as far as the longitudinal edge 104 is located, but does extend further than the locations of the longitudinal edge 102, the inflation channel 112, and the cross seals 114 that forms the ports 124.

The system 200 includes a nozzle 240 configured to inflate the inflatable web 222. In some embodiments, the nozzle 240 is configured to direct inflatable gas into the inflation channel 112 that then passes into the chambers 116 via the ports 124. In some embodiments, the nozzle 240 includes an outlet 242 out of which the pressurized gas passes. In the depicted embodiment, as can be seen in FIG. 3A, the nozzle 240 extends from the raised surface 206 of the support structure 202 and then is curved in the downstream direction such that the outlet 242 is oriented downstream. As can be seen in FIG. 2, the path 226 of the inflatable web 222 passes on both sides of the nozzle 240, indicating that the two sides of the inflation channel 112 pass on either side of the nozzle 240. In the depicted embodiment, the inflation channel 112 is an open inflation channel so that the two sides of the inflation channel 112 can pass on either side of the nozzle 240. In other embodiments, as discussed below, the inflation channel 112 can be a closed inflation channel and a cutting mechanism can be located upstream of the nozzle 240 to cut the closed inflation channel and allow the two sides of the inflation channel 112 pass on either side of the nozzle 240.

Figure 3B:
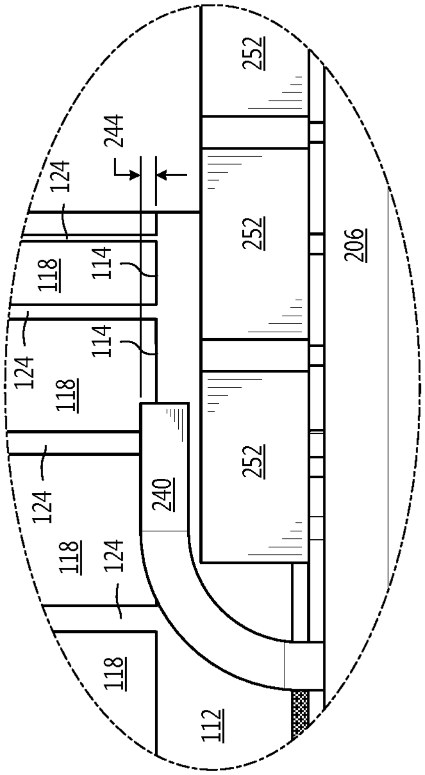
FIG. 3B depicts a detail view of a portion of the view in FIG. 3A showing the top of a nozzle located higher than the bottom of the cross seals of the inflatable web, in accordance with the embodiments disclosed herein.

In some embodiments, the supply 220 is held by the spindle 210 with respect to the nozzle 240 such that the nozzle 240 is higher than the cross seals 114. FIG. 3B shows a detail view of a portion of the view in FIG. 3A. As shown in FIG. 3B, the top of the nozzle 240 is located higher than the bottom of the cross seals 114. In the depicted embodiment, the top of the nozzle 240 is located higher than the bottom of the cross seals 114 by an offset 244. In some embodiments, the dimensions of components of the system 200 (e.g., the dimensions of the nozzle 240, the dimensions of the support structure 202, the dimensions of the spindle 210, the dimensions of the supply 220, etc.) are selected so that the top of the nozzle 240 is located higher than the bottom of the cross seals 114 and/or the offset 244 is within a particular range.

The system 200 also includes an engagement system 250 configured to hold the inflation channel 112 closed downstream of the nozzle 240 until the ports 124 are sealed. Holding the inflation channel 112 closed deters gas from escaping the chambers 116 so that the chambers 116 remain inflated. In addition, gas escaping between the two sides of the inflation channel 112 tends to have a reed effect whereby the sides of the inflation channel 112 vibrate and produce relatively loud noise. This reed effect noise can be at a volume and/or frequency that is particularly difficult for people to be around for extended periods of time. The engagement system 250 deters the reed effect from the open ends of the inflation channel 112. In the depicted embodiment, the engagement system 250 includes a number of engagement rollers 252 that the path 226 passes between. In some embodiments, the engagement rollers 252 are positioned to minimize the distance between each consecutive pair of rollers and maximize the amount of contact between the engagement rollers 252 and the inflatable web 222. In other embodiments, the engagement system 250 can include sprockets, belts, bearings, and/or any other device capable of holding closed the ends of the inflation channel 112.

The system 200 further includes a seal system 260 configured to form a seal across the ports 124 to seal closed the chambers 116. In some embodiments, the seal system 260 is configured to form a heat seal in the inflatable web 222. In the depicted embodiment, the seal system 260 includes rollers 262 and 264 that form a nip through which the inflatable web 222 passes. The roller 262 includes a heating element 266 that passes around the circumference of the roller 262. The heating element 266 is configured to heat the inflatable web 222 as the inflatable web 222 passes through the nip between the rollers 262 and 264. The roller 264 serves as a backing for the heating element 266. As can be seen in FIG. 3A, the heating element 266 is positioned above the bottom of the cross seals 144 and below the cells 120 of the chambers 116 so that a seal formed by the heating element 266 is located above the bottom of the cross seals 144 and below the cells 120 of the chambers 116. In other embodiments, the seal system 260 can include a heating wire, a heating block, a drag sealer, or any other mechanism configured to form a seal in the inflatable web 222.

Figure 4C:
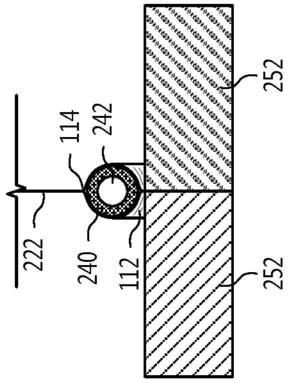
FIG. 4C depicts a partial cross-sectional view of the system shown in FIG. 4B that includes the outlet of the nozzle, in accordance with the embodiments disclosed herein.
Figure 4B:
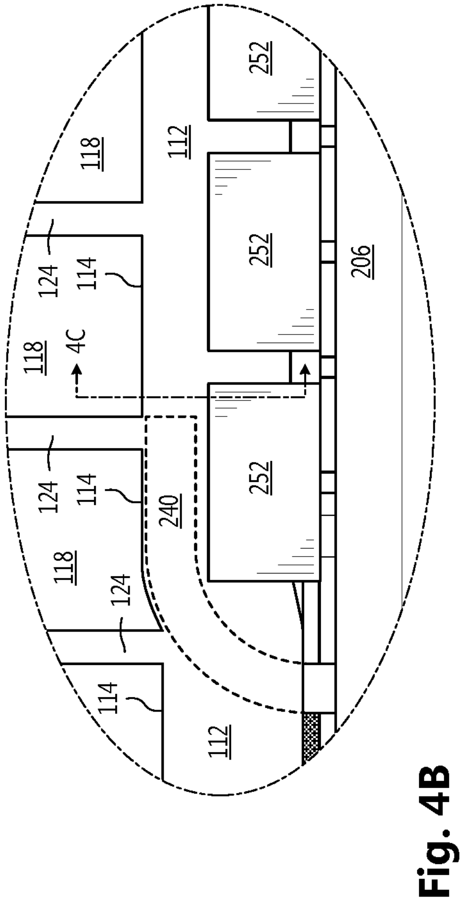
FIG. 4B depicts a detail view of the cross seals contacting the nozzle as the inflatable web is fed through the system shown in FIGS. 2 and 3A, in accordance with the embodiments disclosed herein.
Figure 4A:
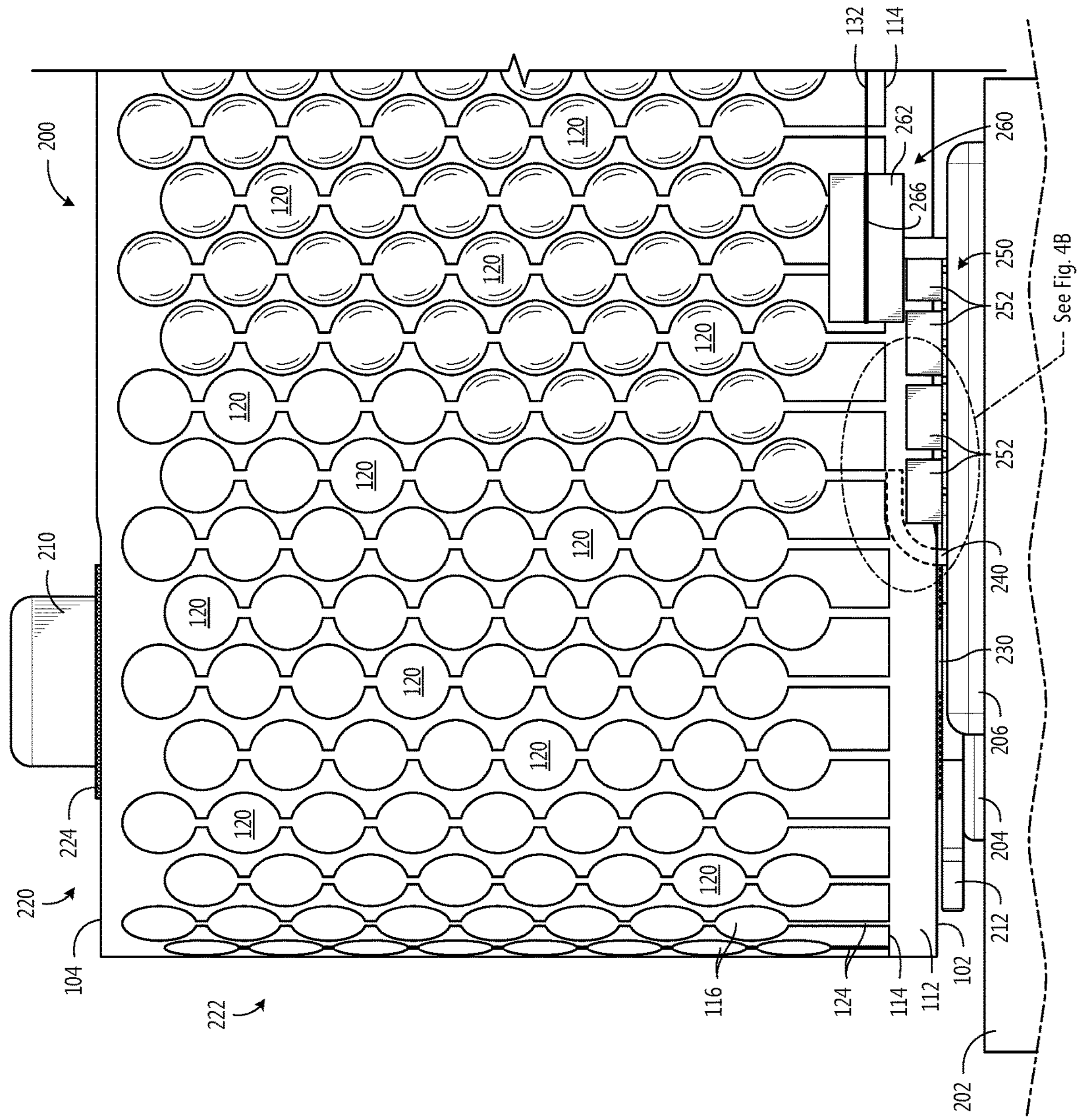
FIG. 4A depicts an example of the system shown in FIGS. 2 and 3A while feeding, inflating, and sealing the inflatable web, in accordance with the embodiments disclosed herein.

FIG. 4A depicts an example of the system 200 while feeding, inflating, and sealing the inflatable web 222. The inflatable web 222 is fed from the supply 220 around the routing member 230. From the routing member 230, the inflatable web 222 is fed to the nozzle 240 and the two sides of the inflation channel 112 pass on opposite sides of the nozzle 240. After the two sides of the inflation channel 112 pass the nozzle 240, the two sides of the inflation channel are brought together and held closed by the engagement system 250. The inflatable web 222 also passes to the seal system 260 where the seal 132 is formed in the inflatable web 222 across the ports 124. In some embodiments, one or both of the engagement system 250 or the seal system 260 is driven to feed the inflatable web from the supply 220 through the system 200. In the depicted embodiment, the rollers 262 and 264 of the seal system 260 are driven to counterrotate and "pull" the inflatable web 222 from the supply through the system 200. Similarly, the engagement rollers 252 of the engagement system 250 can also be driven to pull the inflatable web 222 from the supply through the system 200. In embodiments where both the rollers 262 and 264 and the engagement rollers 252 are driven, the system 200 may include a computing device (e.g., a controller) configured to control the speeds of the rollers 262 and 264 and the engagement rollers 252 so that the rollers 262 and 264 and the engagement rollers 252 pull the inflatable web 222 at the same rate. In other embodiments, the engagement rollers 252 may be driven at a speed that is slower than the speeds of the rollers 262 and 264 to induce tension in the inflatable web 222.

As can be seen in FIG. 4A and in greater detail in the detail view shown in FIG. 4B, the cross seals 114 contact the nozzle 240 as the inflatable web 222 is fed through the system 200. In the depicted embodiments, the cross seals 114 initially contact a curved portion of the nozzle 240 that is curved downstream along the path 226 of the inflatable web 222. After the initial contact, the cross seals 114 continue to pass along (or "ride" along) the portion of the nozzle 240 that extends downstream to the outlet 242. In some embodiments, the cross seals 114 contact the nozzle 240 because the top of the nozzle 240 is located higher than the bottom of the cross seals 114 when the inflatable web 222 on the supply 220. In this case, gravity biases the cross seals 114 toward the nozzle 240 so that the cross seals 114 contact the nozzle 240 as the inflatable web 222 is fed through the system 200. In the depicted embodiment, the heating element 266 is arranged higher than the top of the nozzle 240 so that the seal 132 is formed in the inflatable web 222 above the bottom of the cross seals 114. In this way, the nozzle 240 functions as a passive tracking mechanism to properly and passively align the inflatable web 222 with respect to the heating element 266. The passive tracking occurs without the need for a sensor to track the position of the inflatable web 222, an actuator to move the supply 220, or any other component to track and/or move the inflatable web 222.

In addition to provide proper tracking of the inflatable web 222, the contact between the cross seals 114 and the nozzle 240 also reduces the overall reed effect during inflation of the inflatable web 222. FIG. 4C depicts a partial cross-sectional view of the system 200 that shows the outlet 242 of the nozzle 240, the inflatable web 222 at the end of the nozzle 240, and two of the engagement rollers 252 at the end of the nozzle 240. As can be seen, the cross seals 114 of the inflatable web 222 ride on the top of the nozzle 240, effectively minimizing the gap between the inflatable web 222 and the nozzle 240 above the nozzle 240. The engagement rollers 252 are positioned with respect to the bottom of the nozzle 240 so that the sides of the inflation channel 112 are brought together in proximity to the bottom of the nozzle 240, thereby minimizing the gap between the inflatable web 222 and the nozzle 240 below the nozzle 240. As described above, the gaps in the inflatable web 222 between the engagement rollers 252 are minimized, the gaps between the rollers 262 and 264 are minimized, and the gap between the engagement rollers 252 and the rollers 262 and 264 is minimized. This arrangement essentially creates a pocket in the inflation channel 112 between the nozzle 240, the engagement rollers 252, and the rollers 262 and 264. This pocket in the inflation channel 112 directs the pressurized gas exiting the outlet 242 to pass into the chambers 116 via the ports 124. This pocket in the inflation channel 112 also reduces the reed effect because the pressurized gas is deterred from existing the pocket in the inflation channel 112 at any location other than the ports 124.

Figure 5C:
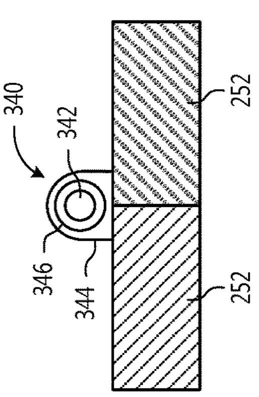
FIG. 5C depicts a partial cross-sectional view of the system shown in FIGS. 5A and 5B that includes the outlet of the nozzle, in accordance with the embodiments disclosed herein.

Other embodiments of nozzles can be used for passive tracking of inflatable webs. Depicted in FIGS. 5A and 5B are partial top and side views, respectively, of another embodiment of a system 300 for feeding, inflating, and sealing the inflatable web 222. The system 300 includes components similar to the system 200, such as the spindle 210, the routing member 230, the engagement system 250, and the seal system 260. The system 300 also includes a nozzle 340 that has an outlet 342. The nozzle 340 includes a block 344 that extends from the raised surface 206 and a tube 346 that extends from the block 344. FIG. 5C depicts a partial cross-sectional view of the system 300 that shows the outlet 342 of the nozzle 340 and two of the engagement rollers 252 at the end of the nozzle 340. As can be seen in FIG. 5C, the depicted embodiment of the block 344 includes a rounded top that has a larger radius than the tube 346. The top of the block 344 also includes a ramped surface 348 on the upstream side of the block 344 that extends upward in the downstream direction.

Figure 5D:
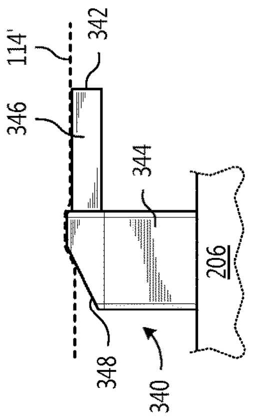
FIG. 5D depicts a side view of the nozzle from the system shown in FIGS. 5A and 5B and a path of the cross seals of an inflatable web if the inflatable web were fed past the nozzle, in accordance with the embodiments disclosed herein.
Figure 5A:
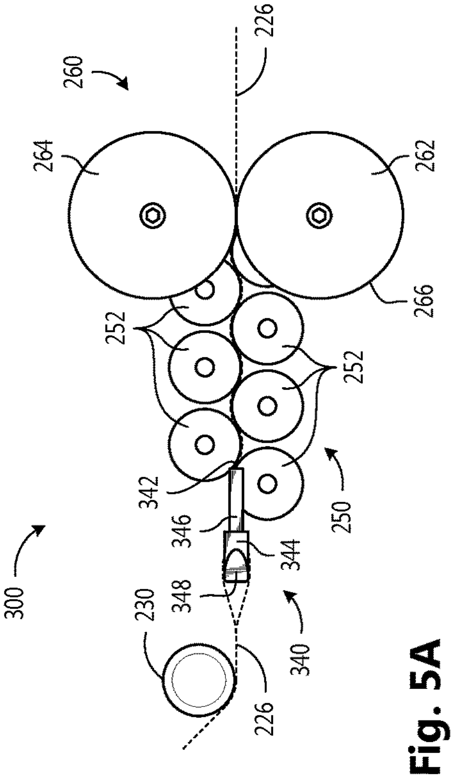
FIGS. 5A and 5B depicts partial top and side views, respectively, of another embodiment of a system for feeding, inflating, and sealing the inflatable web, in accordance with the embodiments disclosed herein.
Figure 5B:
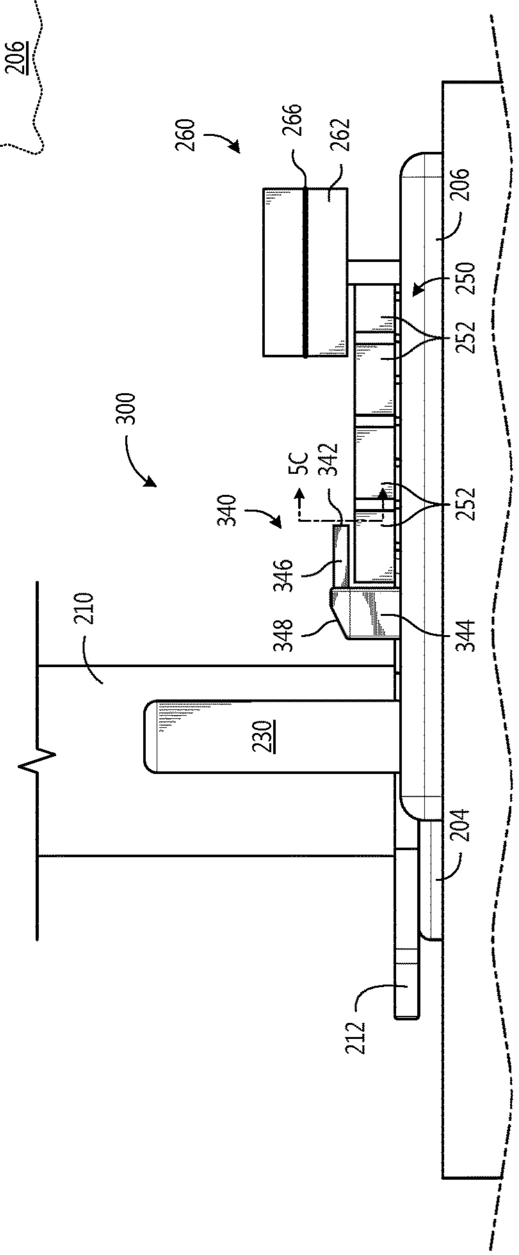

FIG. 5D depicts a side view of the nozzle 340 and a path 114' of the cross seals 114 of the inflatable web 222 if the inflatable web 222 were fed past the nozzle 340. The path 114' initially contacts the nozzle 340 on the ramped surface 348. The ramped surface 348 deflects the path 114' upward as the path 114' advances downstream. The path 114' rides along the ramped surface 348 and the top of the block 344. As the path 114' advances downstream beyond the block 344, the path 114' drops down to and rides along the top of the tube 346. When the path 114' is at the downstream end of the tube 346, the gap between the cross seals 114 and the top of the tube 346 would be minimized and the gap in the inflatable channel 112 between the bottom of the tube 346 and the engagement rollers 252 would also be minimized. In this way, the nozzle 340 provides passive tracking for the cross seals 114 and reduces the reed effect for the inflatable channel 112.

As noted above, the systems described herein can be used with inflatable webs that have either open inflation channels or closed inflation channels. The embodiments of the systems 200 and 300 have been described and depicted for use with an inflatable web 222 where the inflation channel 112 is an open inflation channel. The systems 200 and 300 can be adapted for use with inflation webs that have closed inflation channels.

Figure 6A:
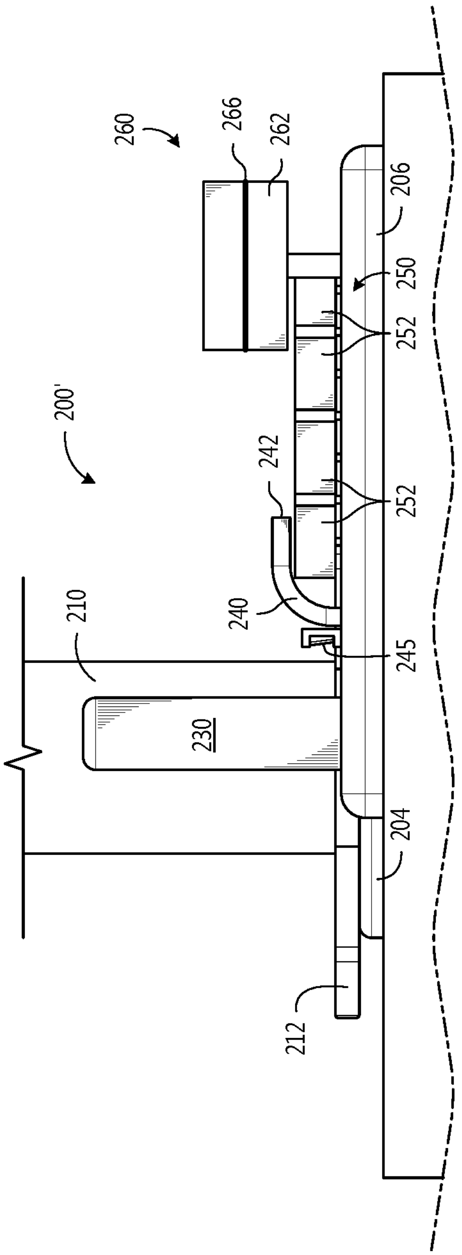
FIGS. 6A and 6B depict embodiments of a system that are variations of the systems shown in FIGS. 2A, 3, 5A, and 5B that can be used with inflation webs having closed inflation channels, in accordance with the embodiments disclosed herein.

FIG. 6A depicts an embodiment of a system 200' that is a variation of the system 200 but can be used with inflation webs having closed inflation channels. The system 200' includes components similar to the system 200, such as the spindle 210, the routing member 230, the nozzle 240, the engagement system 250, and the seal system 260. The system 200' further includes a cutting element 245 that is located upstream of the nozzle 240. The cutting element 245 is configured to cut the closed inflation channel of an inflatable web as the inflatable web is fed through the system 200'. Because the cutting element 245 is located upstream of the nozzle 240, the cutting element 245 is configured to cut the closed inflation channel of the inflatable web before the inflatable web reaches the nozzle 240 so that the two sides of the cut inflatable channel can pass around opposite sides of the nozzle 240.

Figure 6B:
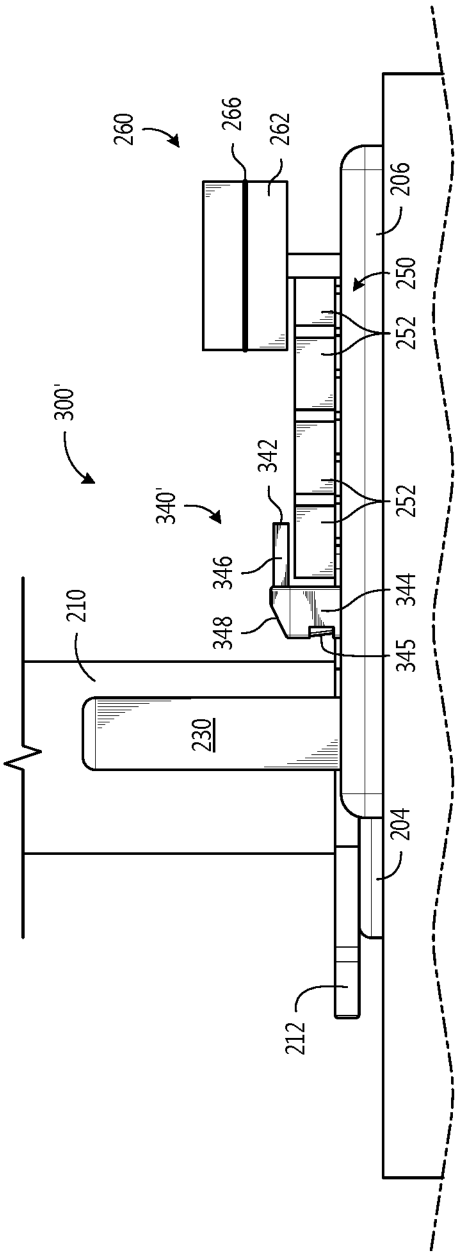

FIG. 6B depicts an embodiment of a system 300' that is a variation of the system 300 but can be used with inflation webs having closed inflation channels. The system 300' includes components similar to the system 300, such as the spindle 210, the routing member 230, the engagement system 250, and the seal system 260. The system 300' further includes a nozzle 340' that is a variation of the nozzle 340. The nozzle 340' includes the outlet 342, the block 344, the tube 346, and the ramped surface 348. The nozzle 340' further includes a cutting element 345 that is located on the upstream side of the block 344. The cutting element 345 is configured to cut the closed inflation channel of an inflatable web as the inflatable web is fed through the system 300'. Because the cutting element 345 is located on the upstream side of the block 340, the cutting element 345 is configured to cut the closed inflation channel of the inflatable web so that the two sides of the cut inflatable channel can pass around opposite sides of the block 344 and the other parts of the nozzle 340.

In the depicted embodiments, the cutting elements 245 and 345 are stationary blades configured to cut the closed inflation channels of inflatable webs. Also, in the depicted embodiment, the blades of the cutting elements 245 and 345 are angled downward in the downstream direction. This angling of the blades of the cutting elements 245 and 345 causes an inflatable web to be biased downward as it is cut by the blade to further bias the longitudinal channel toward the nozzle. Thus, in addition to the downward biasing due to gravity, the cutting elements 245 and 345 can also bias the inflatable web downward. In other embodiments, the cutting elements 245 and 345 can include one or more of a rotary blade, any other type of blade, a heated wire, any other type of heated element, any other cutting element, or any combination thereof.

Figure 7A:
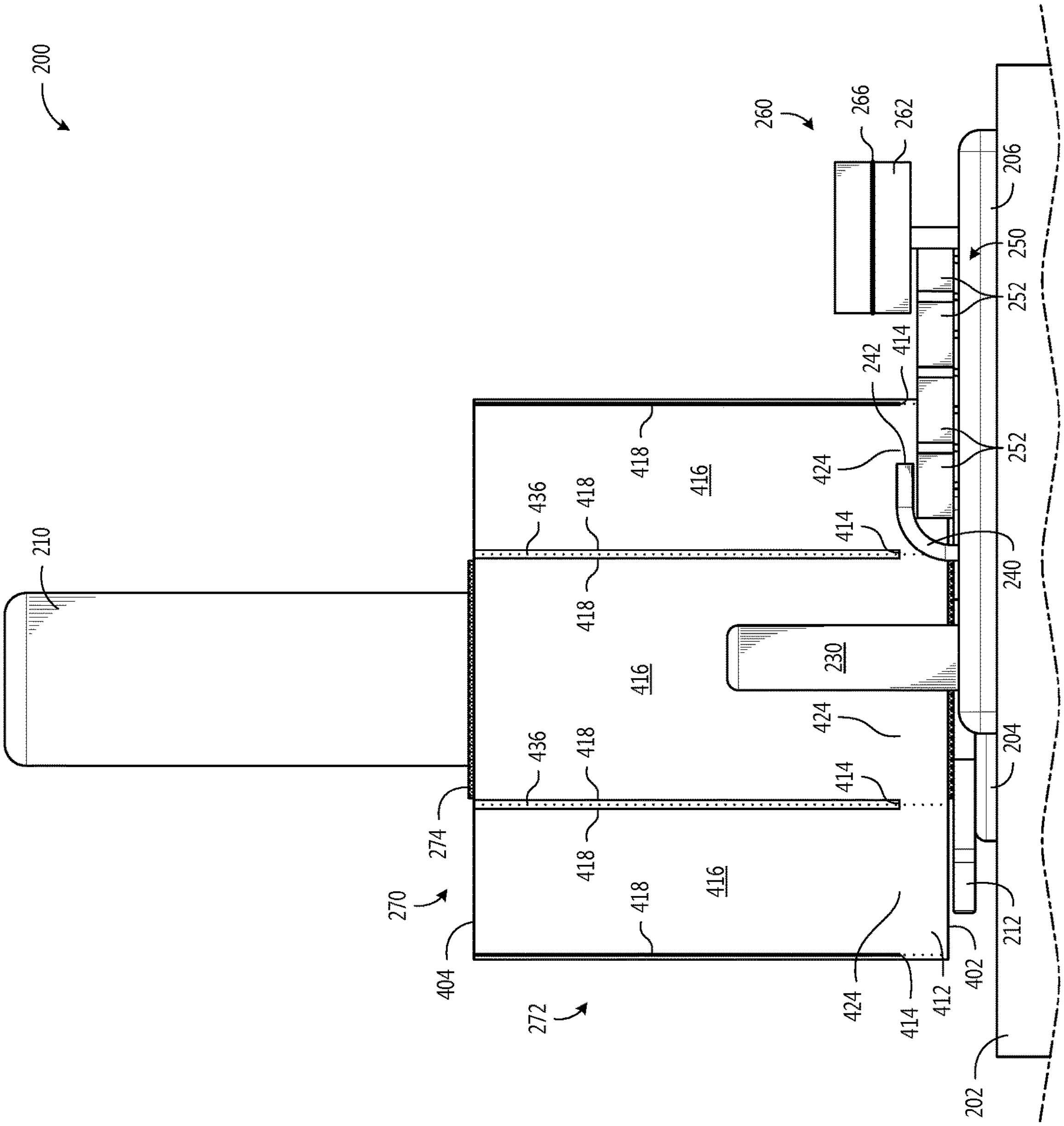
FIGS. 7A and 7B depicts side views of the system shown in FIGS. 2 and 3A being used with a type of an inflatable web that is different from the inflatable web shown in FIGS. 1A and 1B, in accordance with the embodiments disclosed herein.
Figure 7B:
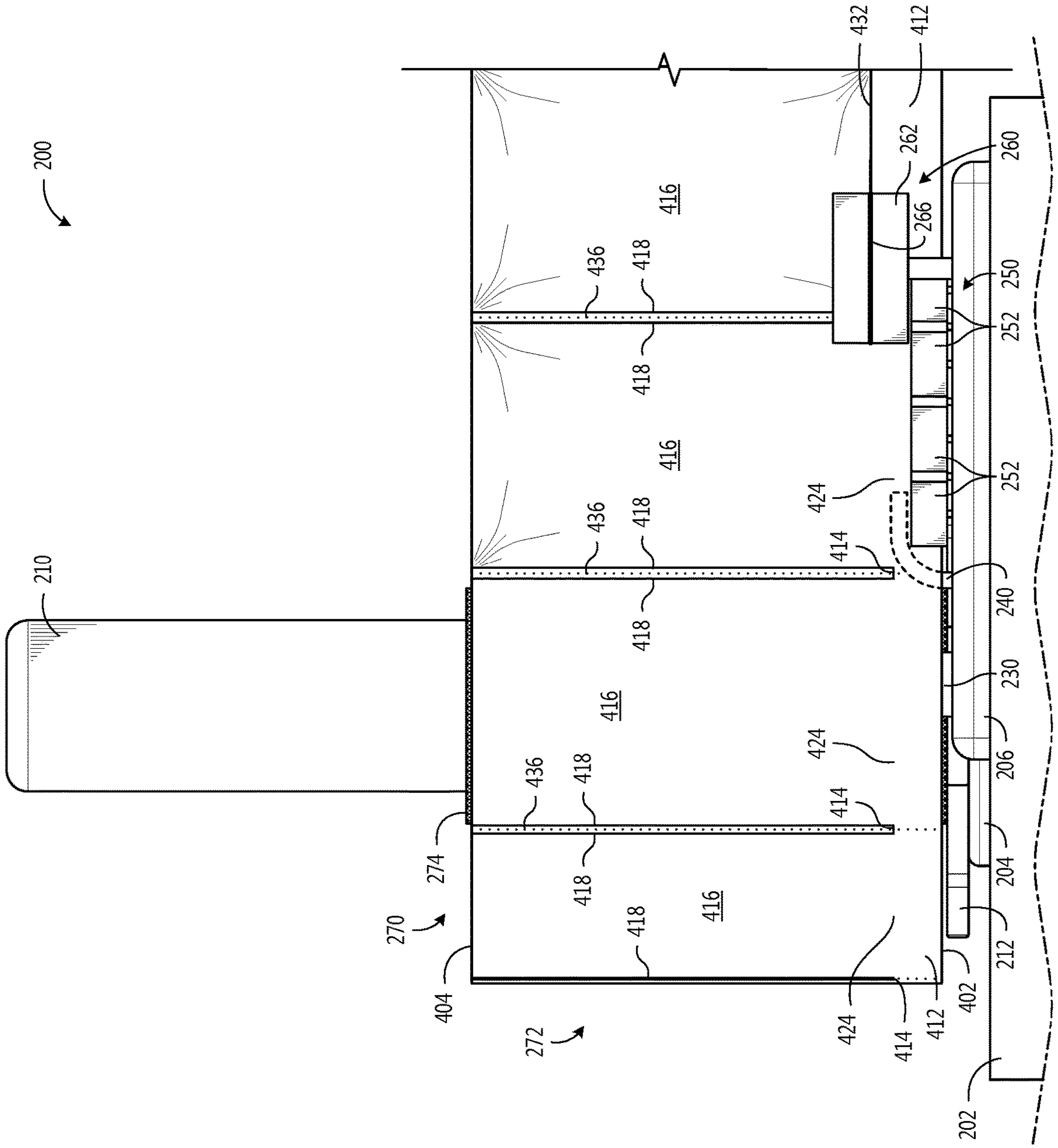

The above embodiments of systems for inflating and sealing inflatable webs have been described and depicted with respect to the inflatable web 100. While the embodiments of systems described herein can be used with the inflatable web 100, the systems described herein can also be used with other types of inflatable webs. Depicted in FIGS. 7A and 7B are side views of the system 200 being used with a supply 270 with an inflatable web 272 that is a different type from the inflatable web 100.

The inflatable web 272 includes two juxtaposed sheets that are arranged such that the inflatable web 272 includes a longitudinal edge 402 and a longitudinal edge 404. Inner surfaces of the two sheets are sealed to each other in a pattern that defines a series of chambers 416. In some embodiments, seals between the two sheets include seals 418 that define the chambers 416. In the depicted embodiment, the chambers 416 are generally rectangular in shape. In other embodiments, the chambers 416 may have other shapes, such as hexagonal shapes, round shapes, irregular shapes, and the like. In the depicted embodiment, the inflatable web 272 includes lines of weakness 436 between the chambers 416. The lines of weakness 436 are configured to allow a user to more easily separate the chambers 416 from each other after the chambers 416 are inflated. In some embodiments, each of the lines of weakness 436 include a perforation, a score, a slit, a cut, a series of hold, any other feature that increases the ability of a user to separate the chambers 416 from each other, or any combination thereof.

In some embodiments, the seals 418 also define ports 424. Each of the ports 424 permits fluid, such as gas (e.g., air), to pass from an inflation channel 412 into one of the chambers 416. In the depicted embodiment, the ends of the seals 418 also form cross seals 414 between the inflation channel 412 and the chambers 416. The ports 424 pass between the cross seals 414 to permit gas to pass from the inflation channel 412 into the chambers 416. In the depicted embodiment, the ports 424 are significantly longer than the cross seals 414, which is in contrast to the ports 124 that are significantly shorter than the cross seals 114 in the inflatable web 100. In the depicted embodiment, the inflation channel 412 is an open inflation channel. In other embodiments, the inflation channel 412 can be a closed inflation channel.

In the depicted embedment, the supply 270 is a roll of the inflatable web 272 that is wound around a core 274. In other embodiments, the system 200 can include any other device for holding a supply of inflatable web, such as a dispenser configured to hold a supply of inflatable web in the form of a fanfolded stack of the inflatable web. The core 274 and the inflatable web 272 are not as wide as the core 224 and the inflatable web 222. Thus, the core 274 and the inflatable web 272 are "shorter" when placed on the spindle 210 than the core 224 and the inflatable web 222. It will be apparent that the spindle is capable of providing the same function regardless of how "short" or "tall" a supply roll sits on the spindles. In the depicted embodiment, the inflatable web 272 is oriented so that the longitudinal edge 402 is located closer to the support structure 202 than the longitudinal edge 404. In this way, the inflation channel 412 is located closer to the support structure 202 than the chambers 416 are to the support structure 202.

In the depicted embodiment, the supply 270 is held by the spindle 210 with respect to the nozzle 240 such that the nozzle 240 is higher than the cross seals 414. As shown in FIG. 7A, the top of the nozzle 240 is located higher than the bottom of the cross seals 414. In some embodiments, the dimensions of components of the system 200 (e.g., the dimensions of the nozzle 240, the dimensions of the support structure 202, the dimensions of the spindle 210, the dimensions of the supply 220, etc.) are selected so that the top of the nozzle 240 is located higher than the bottom of the cross seals 414 and/or the offset between the top of the nozzle 240 and the bottom of the cross seals 414 is within a particular range.

FIG. 7B depicts an example of the system 200 while feeding, inflating, and sealing the inflatable web 272. The inflatable web 272 is fed from the supply 270 around the routing member 230. From the routing member 230, the inflatable web 222 is fed to the nozzle 240 and the two sides of the inflation channel 412 pass on opposite sides of the nozzle 240. After the two sides of the inflation channel 412 pass the nozzle 240, the two sides of the inflation channel 412 are brought together and held closed by the engagement system 250. The inflatable web 272 also passes to the seal system 260 where a seal 432 is formed in the inflatable web 272 across the ports 424. In some embodiments, one or both of the engagement system 250 or the seal system 260 is driven to feed the inflatable web from the supply 220 through the system 200. In the depicted embodiment, the rollers 262 and 264 of the seal system 260 are driven to counterrotate and "pull" the inflatable web 272 from the supply through the system 200. Similarly, the engagement rollers 252 of the engagement system 250 can also be driven to pull the inflatable web 272 from the supply through the system 200. In embodiments where both the rollers 262 and 264 and the engagement rollers 252 are driven, the system 200 may include a computing device (e.g., a controller) configured to control the speeds of the rollers 262 and 264 and the engagement rollers 252 so that the rollers 262 and 264 and the engagement rollers 252 pull the inflatable web 272 at the same rate. In other embodiments, the engagement rollers 252 may be driven at a speed that is slower than the speeds of the rollers 262 and 264 to induce tension in the inflatable web 272.

As the inflatable web 272 is fed through the system 200, the cross seals 414. In the depicted embodiments, the cross seals 414 initially contact the curved portion of the nozzle 240 that is curved downstream along the path 226 of the inflatable web 222. After the initial contact, the cross seals 414 continue to ride along the portion of the nozzle 240 that extends downstream to the outlet 242. In some embodiments, the cross seals 414 contact the nozzle 240 because the top of the nozzle 240 is located higher than the bottom of the cross seals 414 when the inflatable web 272 on the supply 270. In this case, gravity biases the cross seals 414 toward the nozzle 240 so that the cross seals 414 contact the nozzle 240 as the inflatable web 272 is fed through the system. In the depicted embodiment, the heating element 266 is arranged higher than the top of the nozzle 240 so that the seal 432 is formed in the inflatable web 272 above the bottom of the cross seals 414. In this way, the nozzle 240 functions as a passive tracking mechanism to properly and passively align the inflatable web 272 with respect to the heating element 266. The passive tracking occurs without the need for a sensor to track the position of the inflatable web 272, an actuator to move the supply 270, or any other component to track and/or move the inflatable web 272.

The cross seals 414 in the inflatable web 272 are shorter and further apart than the cross seals 114 in the inflatable web 100. Unlike the cross seals 114 in the inflatable web 100, one of the cross seals 414 will not come into contact with the nozzle 240 before the preceding one of the cross seals 414 has cleared the nozzle 240. In other words, the nozzle 240 will have intermittent contact with the cross seals 414 when the inflatable web 272 is fed through the system 200 instead of the continuous contact that the nozzle 240 has with at least one of the cross seals 114 when the inflatable web 100 is fed through the system 200. Despite this intermittent contact with the cross seals 414, the nozzle 240 will still passively guide the inflatable web 272. If the inflatable web begins to track improperly while the nozzle 240 is not in contact with any of the cross seals 414, the nozzle 240 will return the inflatable web to a proper tracking position when the next one of the cross seals 414 contacts the nozzle 240. Under normal feed rates, the time frame of possible improper tracking while the nozzle 240 is not in contact with any of the cross seals 414 is sufficiently short that the inflatable web 272 likely cannot deviate from a proper tracking course beyond the range where the nozzle 240 can return the inflatable web back to the proper tracking course when the next one of the cross seals 414 contacts the nozzle.

Figure 8:
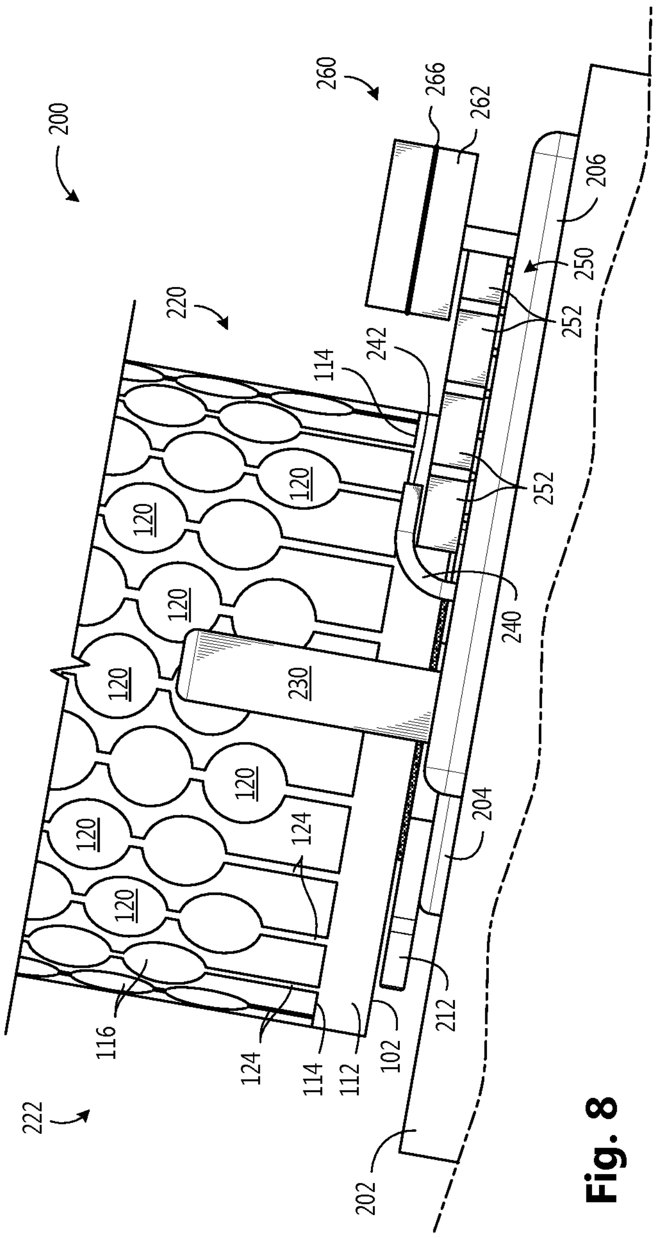
FIG. 8 depicts the system shown in FIGS. 2 and 3A where the support structure has been mounted at a different angle than is shown in FIG. 3A, in accordance with the embodiments disclosed herein.

It will be apparent that any of the systems described herein can be operated in orientations where the path of the inflatable web is not perfectly vertical. For example, FIG. 8 depicts the system 200 and the inflatable web 222 where the support structure 202 has been mounted at a different angle than is shown in FIG. 3A. In FIG. 8, the cross seals 114 are at a non-straight angle with respect to horizontal and the axis of the spindle 210 is at a non-straight angle with respect to vertical. It will be apparent that top of the nozzle 240 is still located "higher" than the cross seals 114 on the supply 220. In particular, the plane that passes through the cross seals 114 on the supply 220 intersects the nozzle 240. In this way, gravity will still bias the cross seals 114 toward the nozzle 240 as the inflatable web 222 is fed through the system 200. Other arrangements of the system 200 are possible while maintaining the function of the nozzle 240 as a passive tracking element. The other systems disclosed here can likewise be mounted or placed at various angles while maintaining the function of their respective nozzles as passive tracking elements.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A system, comprising:

a supply of an inflatable web, wherein the inflatable web includes chambers, an inflation channel, and cross seals between the inflation channel and the chambers, wherein the inflatable web includes ports that pass through the cross seals to permit gas to pass from the inflation channel to the chambers; and a nozzle having an outlet configured to insert gas into the inflation channel as the inflatable web is moved in a downstream direction;

wherein the system is configured to feed the inflatable web along a path from the supply and past the nozzle in the downstream direction;

wherein the system is configured to hold the supply of the inflatable web with respect to the nozzle such that the cross seals contact the nozzle and rides along a portion of the nozzle as the inflatable web is moved in the downstream direction;

wherein the supply is arranged with respect to the nozzle so that a top of the nozzle is located higher than a bottom of the cross seals of the inflatable web when the inflatable web on the supply;

wherein the nozzle includes a block that extends from a support structure and tube that extends in the downstream direction from the block such that the outlet is oriented in the downstream direction; and wherein the block includes a ramped surface that extends upward in the downstream direction.

2. The system of claim 1, wherein the cross seals are biased toward the nozzle by gravity so that the cross seals contact the nozzle as the inflatable web is fed through the system.

3. The system of claim 1, further comprising:

a seal system configured to form a seal in the inflatable web across the ports as the inflatable web is fed through the system.

4. The system of claim 3, wherein the seal system is arranged with respect to the nozzle so that the seal system is configured to form the seal in the inflatable web across the ports at a location that is higher than the top of the nozzle.

5. The system of claim 3, further comprising:

an engagement system configured to hold closed two sides of the inflation channel between the outlet of the nozzle and the seal system.

6. The system of claim 5, wherein the engagement system is configured to bring the two sides of the inflation channel together in proximity to a bottom of the nozzle.

7. The system of claim 1, wherein the system is configured to hold the supply of the inflatable web with respect to the nozzle such that initial contact of the cross seals with the nozzle occurs in a curved portion of the nozzle.

8. The system of claim 7, wherein the nozzle is configured such that the cross seals ride along the top of the nozzle after the initial contact of the cross seals with the curved portion of the nozzle.

9. The system of claim 1, wherein the system is configured to hold the supply of the inflatable web with respect to the nozzle such that initial contact of the cross seals with the nozzle occurs on the ramped surface of the block.

10. The system of claim 9, wherein the nozzle is configured such that the cross seals ride along the top of the tube after the initial contact of the cross seals with the ramped surface.

11. The system of claim 1, wherein the system further comprises:

a spindle configured to hold the supply of the inflatable web;

wherein the supply is in the form of a roll of the inflatable web.

12. The system of claim 1, where a length of one of the cross seals between two consecutive ports is less than a length of at least one of the two consecutive ports.

13. The system of claim 1, where a length of one of the cross seals between two consecutive ports is greater than a length of at least one of the two consecutive ports.

14. The system of claim 1, further comprising:

a routing member positioned such that the inflatable web passes around a portion of the routing member as the inflatable web is fed in the downstream direction;

wherein the routing member is further configured to induce tension in at least a portion of the inflatable web downstream of the routing member; and wherein the at least a portion of the inflatable web in which the routing member induces tension includes the inflation channel.

15. The system of claim 1, wherein the system further comprises:

a spindle configured to hold the supply of the inflatable web;

wherein the spindle is oriented such that the axis of the spindle is substantially vertical or at an angle with respect to vertical that is less than or equal to 30°.

16. A system comprising:

a supply of an inflatable web, wherein the inflatable web includes chambers, an inflation channel, and cross seals between the inflation channel and the chambers, wherein the inflatable web includes ports that pass through the cross seals to permit gas to pass from the inflation channel to the chambers; and a nozzle having an outlet configured to insert gas into the inflation channel as the inflatable web is moved in a downstream direction;

wherein the system is configured to feed the inflatable web along a path from the supply and past the nozzle in the downstream direction;

wherein the system is configured to hold the supply of the inflatable web with respect to the nozzle such that the cross seals contact the nozzle and rides along a portion of the nozzle as the inflatable web is moved in the downstream direction;

wherein the supply is arranged with respect to the nozzle so that a top of the nozzle is located higher than a bottom of the cross seals of the inflatable web when the inflatable web on the supply;

wherein the system further comprises:

a spindle configured to hold the supply of the inflatable web, wherein the supply is in the form of a roll of the inflatable web, and a support located underneath the supply, the support having a hub that includes a hole;

wherein the spindle passes through the hole in the hub of the support;

wherein the support is configured to rotate with respect to the spindle; and wherein the support includes a plurality of arms that extend away from the hub so that the plurality of arms extend beyond an outer circumference of the roll of the inflatable web.

17. The system of claim 16, wherein the spindle is arranged such that the spindle is at a non straight angle with respect to vertical.

* * * * *